(12) United States Patent
Cui et al.

(10) Patent No.: US 7,642,932 B2
(45) Date of Patent: Jan. 5, 2010

(54) METHOD OF MAPPING CHARACTERS FOR A MOBILE TELEPHONE KEYPAD

(75) Inventors: Yanqing Cui, Beijing (CN); Fumiko Ichikawa, Beijing (CN)

(73) Assignee: Nokia Corporation, Espoo (FI)

( * ) Notice: Subject to any disclaimer, the term of this patent is extended or adjusted under 35 U.S.C. 154(b) by 187 days.

(21) Appl. No.: 11/152,825

(22) Filed: Jun. 14, 2005

(65) Prior Publication Data

US 2006/0279433 A1 Dec. 14, 2006

(51) Int. Cl.
*H03M 11/00* (2006.01)
(52) U.S. Cl. ...................................... 341/22; 455/550.1
(58) Field of Classification Search .................... 341/22; 455/550.1, 90.3, 575.1; 715/536, 534
See application file for complete search history.

(56) References Cited

U.S. PATENT DOCUMENTS

| 2003/0052164 | A1* | 3/2003 | Higginson | 235/380 |
| 2004/0204011 | A1* | 10/2004 | Lyustin et al. | 455/550.1 |
| 2005/0017955 | A1* | 1/2005 | Jayachandra | 345/171 |
| 2006/0123354 | A1* | 6/2006 | Volovitz | 715/780 |

* cited by examiner

*Primary Examiner*—Albert K Wong
*Assistant Examiner*—Hung Q Dang
(74) *Attorney, Agent, or Firm*—Perman & Green LLP

(57) ABSTRACT

In a mobile communications device used in countries having a prevailing language with a large number of alphabet characters, the keypad is mapped alphabet into two groups and mapping each of the groups to the keypad to provide two independent modes of selection. The user can toggle from one mode to the other by operating a separate switch to enable selections from each of the alphabet groups.

19 Claims, 8 Drawing Sheets

Consonants (44):

ก ข ฃ* ค ฅ* ฆ ง จ ฉ ช ซ ฌ ญ ฎ ฏ ฐ ฑ ฒ ณ ด ต ถ ท ธ น บ ป ผ ฝ พ ฟ ภ ม ย ร ล ว ศ ษ ส ห ฬ อ ฮ

Obsolete letters

Others (28):

Leading vowels (5):   เ- แ- โ- ใ- ไ-

Following vowels (6):   -ะ -า -ๅ -ํา

Below vowels (2):   -ุ  -ู

Above vowels (5):   -ิ -ี -ึ -ื -ั

Above diacritics (4):   -่ -้ -๊ -๋

Below diacritics (1):

Tone marks (4):   -่ -้ -๊ -๋

Others (1):   ๆ

* Not commonly used, mainly used in reigion

FIG. 3

| key 1 | key 2 | key 3 | key 4 | key 5 | key 6 | key 7 | key 8 | key 9 |
|---|---|---|---|---|---|---|---|---|
| ก | ข | ช | ญ | ต | น | ห | ร | ส |
| ฃ | ฆ | ซ | ฎ | ถ | บ | ฬ | ล | ษ |
| ฅ | ฉ | ฌ | ฏ | ท | ป | ฟ | ว | ฬ |
| ค | ฑ | ฒ | ฐ | ธ | ผ | ม | ศ | อ |
| ฆ | 2 | 3 | ฯ | ด | พ | ย | ษ | ฮ |
| 1 | | | ณ | 5 | 6 | 7 | 8 | 9 |
| | | | 4 | | | | | |

FIG. 6

| Key1 | Key2 | Key3 | Key4 | Key5 | Key6 | Key7 | Key8 | Key9 |
|------|------|------|------|------|------|------|------|------|
| ◌ี | ◌ั | ◌์ | เ- | ไ- | -า | ๆ | ◌ู | ◌่ |
| ◌ื | ◌ิ | ◌๊ | แ- | ใ- | -ำ | -ฤ | ◌ุ | ◌้ |
| ◌ํ | ◌ึ | ◌๋ | โ- | -ะ | ◌ํา | -ฦ | ◌. | ◌๊ |
| 1 | 2 | 3 | 4 | 5 | 6 | 7 | 8 | ◌๋ |
|   |   |   |   |   |   |   |   | 9 |
| Above vowel | Above vowel/ diacritics | Above Diacritics | Leading vowel | Leading/follo wing vowels | Following vowels | Uncommon letters | below vowels diacritics/ | tone marks |

FIG. 7

METHOD OF MAPPING CHARACTERS FOR A MOBILE TELEPHONE KEYPAD

BACKGROUND OF THE INVENTION

1. Field of the Invention

The invention of this application relates to telephone keypads and more particularly to a method for mapping the inputs generated by the operation of a keypad for a mobile telephone.

2. Brief Description of Related Developments

In several emerging mobile phone markets, there are obstacles in the way of everyday usage created by the large alphabets present in the language, for example Thai and Hindi. Such large alphabets challenge the prevailing systems for entering text into the phone for address books, messaging and other purposes. The prevailing system of multi-tap, based on the Latin alphabet which is comprised of 26 characters, becomes cumbersome when applied to, for example the Thai alphabet of 70 characters.

The keypad is the main user interface for entering text in a mobile phone product. In such devices, there are generally 10 numeric keys that can be used to enter numerical and alphabetic characters. To enter alphabetic characters, a couple of letters are mapped into each key. Some disambiguation technologies are needed to pick the right letter. Multi-tap is one of the most common techniques in disambiguating keystrokes. With this approach, the user presses each key one or more times to specify the input character. For example, in an English input method, key 2 is pressed once for the character A, twice for B, and three times for C. Applying this technique to an alphabet consisting of 70 characters, such as the Thai alphabet, requires that, if all the letters are mapped into the numeric keys, on the average, about 8 letters have to be mapped to each key. Several problems become immediately apparent. First, it is extremely difficult to physically print all the mapped letters on the keys, as the space on the keypad is too limited. To compromise and print a range of characters requires the user to remember the mapping logic. In such a system, it will be difficult for the user to search and enter the right letter, since too many letters are mapped into each key.

One solution in the prior art for this problem is to imprint only letters at breaking points on the physical key. Using English as an example, in an ITU-T keypad English input, "a b c" is mapped to key 2. "d e f" is mapped to key 3, and so on. So "a" and "c", "d" and "f" are the breaking points in the alphabet. In the solution, the labels like "a-c", "d-f" are printed on the numeric keys. If only breaking letters are shown on the keys using an extensive alphabet, the user has to memorize all the letters that fall between two breaking points. This is a significant burden when an alphabet, such as Thai or Hindi is applied. Users have to figure out how many presses are needed to find the right letter.

Another prior art solution is to support only partial alphabet by multi-tap input. For example, some Thai inputs only support multi-tap to input consonants. All the other vowels, diacritics, tone marks, etc. are shown in one grid for user to select. Just as special character input in Chinese, all the special characters are shown in the grid, user can navigate and select by navi keys.

This input method, however, is not consistent for different letter groups. The user has to use different logic and process to enter different letter groups. Multi-tapping is used to enter consonants and grid navigation is used to input vowels and tone marks. Grid selection is time consuming and prone to errors.

It is an object of this invention to provide a method of mapping characters to a mobile telephone keypad that is consistent in all alphabet letters, so that the user can use the same logic and sequence to input all the alphabet items, including consonants, vowels, diacritics, tone marks and other common items.

It is another object of this invention, to limit the need for a user to remember key mapping details when they search for the right letter, by providing visual indications to assist in the selection of the right key and the right number of times a key needs to be pressed for the desired character.

It is another object of this invention to avoid the need for a user to move their focus between physical keyboard and display, by providing enough information on a display screen and mapping non-consonant items in a user-friendly way to enable a user to find the desired non-consonant items easily.

SUMMARY OF THE INVENTION

The keypad of a mobile communications device, such as a mobile telephone, personal digital assistant, pager and the like is mapped with a large array of characters used in languages having extensive alphabets, such as Thai and Hindi.

According to one aspect of the invention, a multi-tap method is applied to a large alphabet, such as Thai, for example. This is accomplished by dividing the Thai alphabet into two groups and mapping each of the groups to the keypad to provide two independent modes of selection. The user can toggle from one mode to the other by operating a separate switch to enable selections from each of the alphabet groups.

According to another aspect of the invention, a visual mapping indication is provided in the display to assist the user in scrolling to the desired selection.

According to another aspect of the invention for specific application to the Thai alphabet, non-consonant items of the Thai alphabet are grouped using both the item group and position information to facilitate the selection process.

BRIEF DESCRIPTION OF THE DRAWINGS

The foregoing aspects and other features of the present invention are explained in the following description, taken in connection with the accompanying drawings, in which:

FIG. 3 is a table of the Thai alphabet;

FIG. 6 is a table showing Thai consonant mapping according to this invention;

FIG. 7 is a table showing Thai non-consonant mapping according to this invention.

DETAILED DESCRIPTION OF THE PREFERRED EMBODIMENT(S)

A method of mapping the keypad 10 of a mobile communications device 1, for example a cellular telephone incorporating features of the present invention is illustrated in the figures. Although the present invention will be described with reference to the embodiments shown in the figures, it should be understood that the present invention may have many alternate forms. In addition, any suitable size, shape or type of elements or materials could be used. The Thai alphabet is used for illustrating an alphabet having an extensive array of characters, however the invention is intended for any application in which a large alphabet is required.

Figure 1:
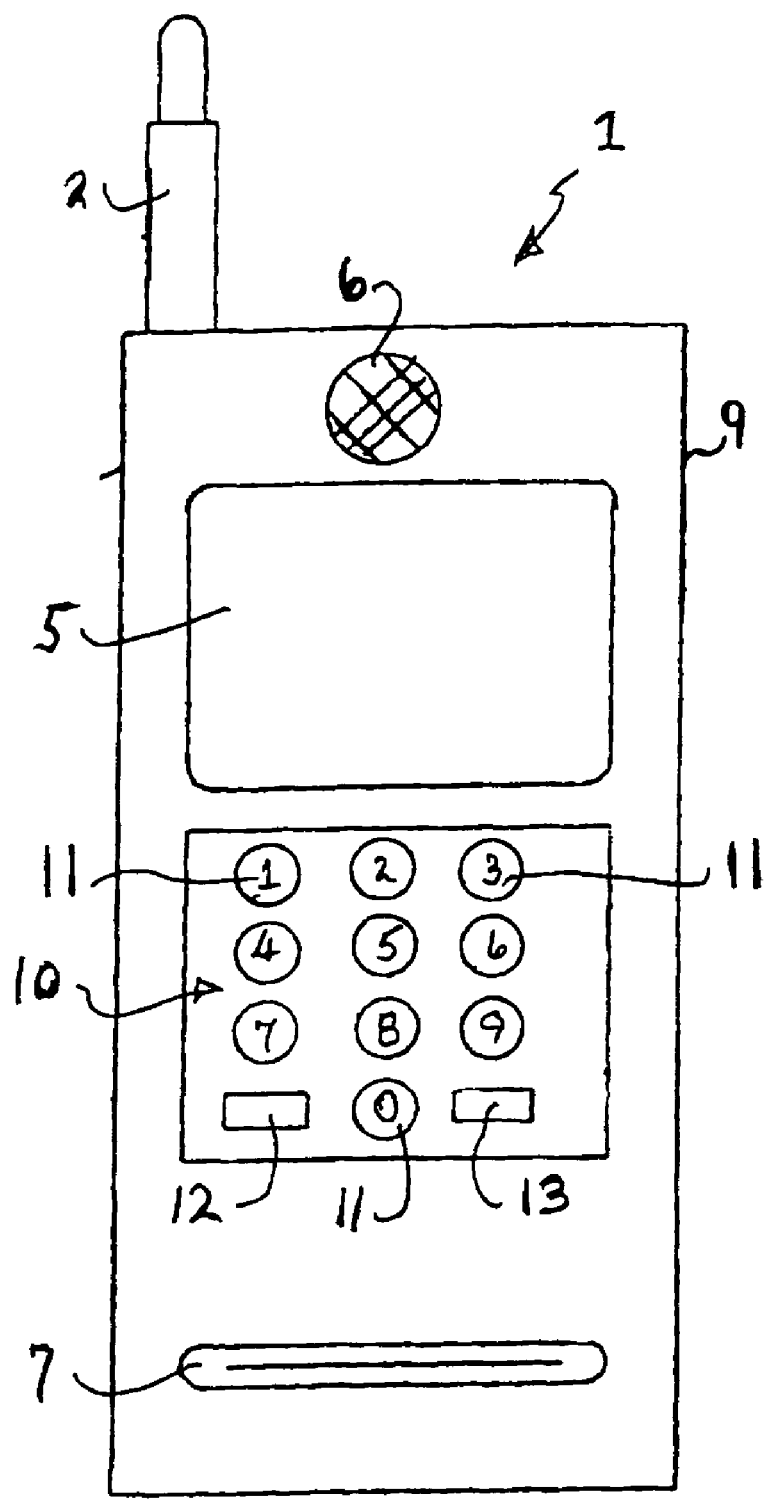
FIG. 1 is a front view of a typical mobile telephone adapted for use with this invention.
Figure 2:
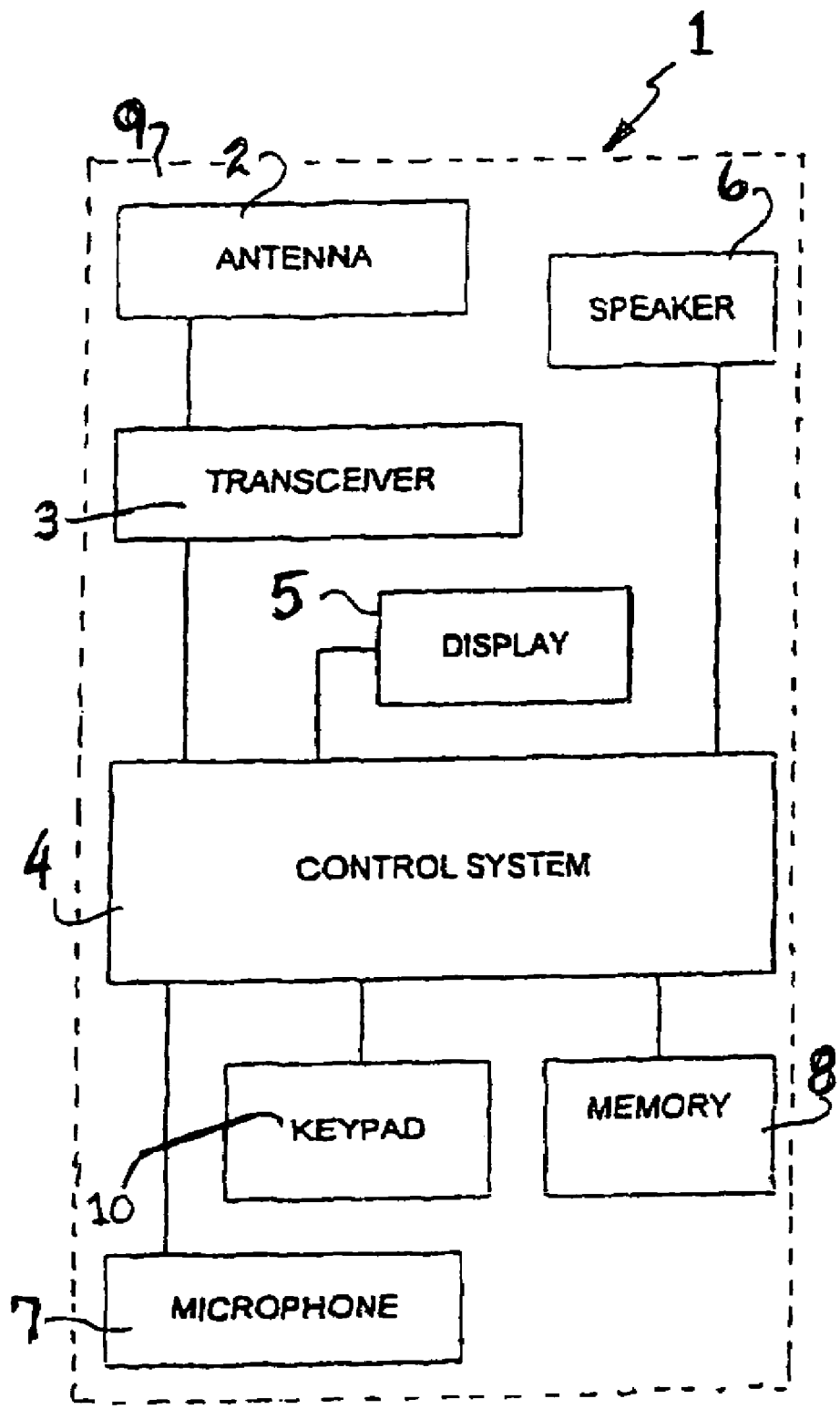
FIG. 2 is block diagram of the components of the mobile telephone of FIG. 1.
Figure 4:
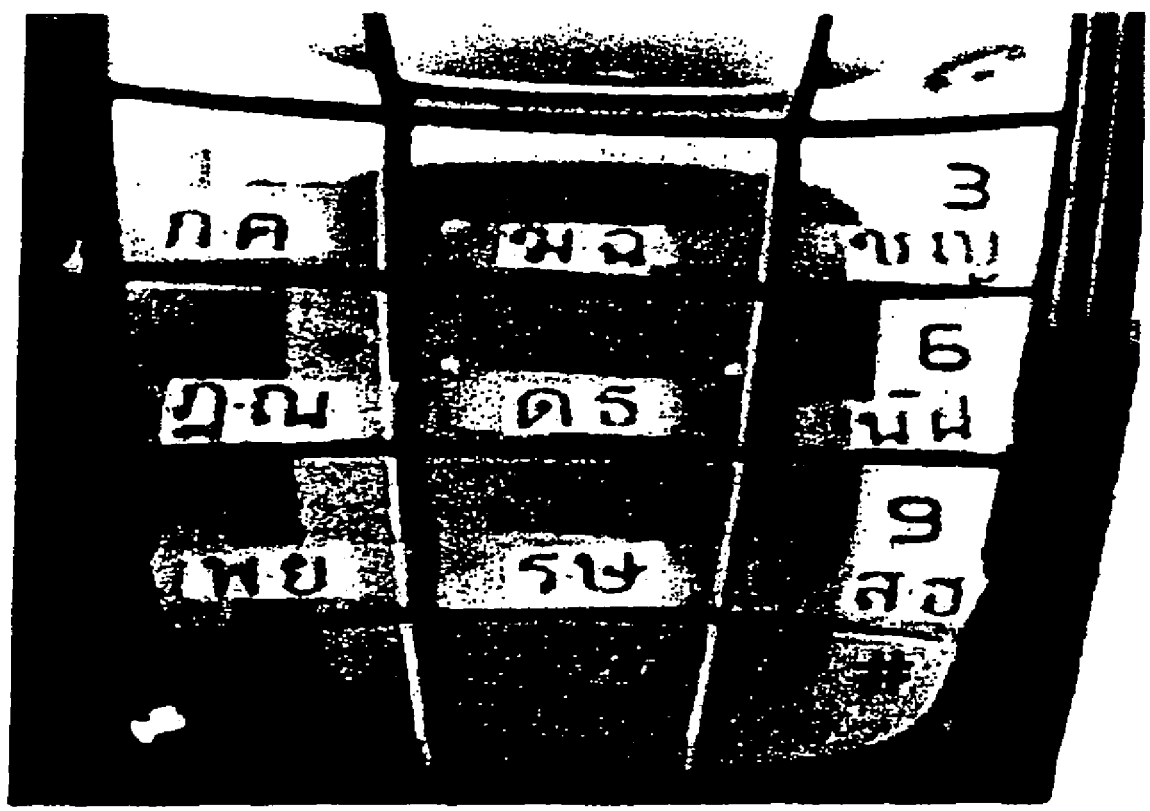
FIG. 4 is a front view of a typical Thai keypad of the prior art.
Figure 5:
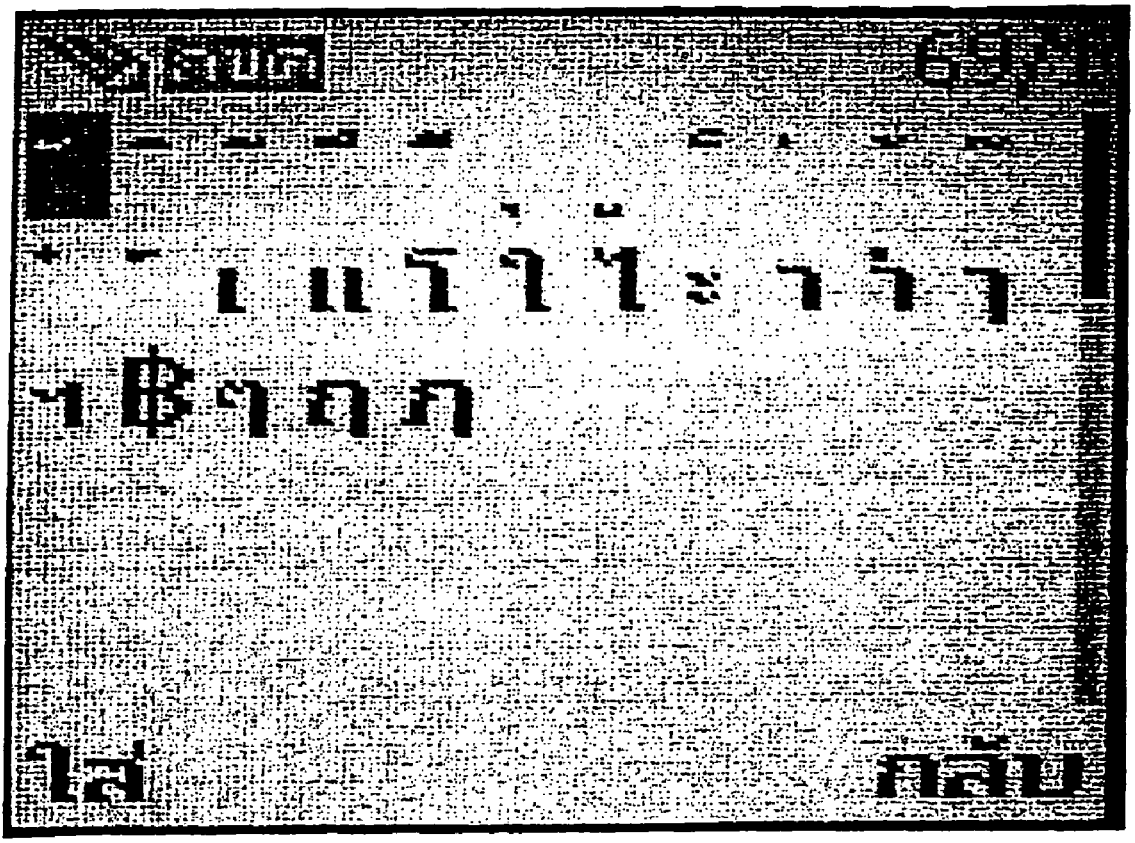
FIG. 5 is an illustration of a grid of non-consonant Thai characters used in prior art mobile telephones.

A mobile telephone 1 is shown in FIG. 1 and is equipped with an antenna 2, a user interface, consisting of display 5, keypad 10, speaker 6 and microphone 7. All of the components of the mobile phone 1 are contained in a housing 9, as shown in the block diagram of FIG. 2. In general mobile phone 1 will be controlled by a control system 4 in the form of a microprocessor and including a memory 8. Control system 4 is constructed with appropriate drivers and algorithms to receive and transmit calls through transceiver 3, and process inputs from keypad 10, and microphone 7. Control system 4 sends data for display on screen 5 or transmission through speaker 6.

Keypad 10 is comprised of an array of ten alphanumeric buttons 11 and function keys 12 and 13. For ease of illustration only the bare minimum number of keys are shown, it being understood a wide variety of keys, buttons are available for scrolling and other functions as is well know. The typical button array 11 will be labeled 0-9 and have multiple letters mapped to each key for example key number 2 is generally assigned the letters abc in the English alphabet. The mapping function is executed by control system 4 through algorithms stored in memory 8.

The entire Thai alphabet is shown in FIG. 3 and includes all of the characters that are to be mapped for selection by the user of a mobile communications device operational in the Thai market. According to this invention, as shown in FIG. 3, the alphabet is divided into two input groups, namely consonants and non-consonants. The consonant group 20 includes 44 Thai consonants. The non-consonant group 30 contains all other input items, including eighteen vowels, five diacritics, four tone marks, and one other common character.

The standard keypad 10, as illustrated in FIG. 1, is constructed having at least array 11 comprised of 10 keys, labeled from 0 to 9 for entering numerical characters. Each of the keys is mapped with alphabet characters selected from each of the groups 20 and 30 and multi-tapping is used to disambiguate a key press.

Since each physical key corresponds to two groups of letters, ie.: for the Thai alphabet, consonant or non-consonant, the user must select the right mode or group first before entering a selection. Consonant mode 20 is set as the default input mode. Therefore, the user must switch to non-consonant group 30 first, if non-consonant items in group 30 are to be selected.

Switching between consonant and non-consonant modes is accomplished by actuation of a dedicated physical key, such as key 12 or 13. The switch key should be different from normal input mode switch key. For example, in some phones, * key, normally key 12 can be used for this purpose, since pound key, normally key 13, may be used for switching among uppercase/lowercase/numbers.

Both consonant and non-consonant modes use the same logic in the user interface design. Therefore, the selection sequence is described only with respect to the consonant group.

Figure 8:
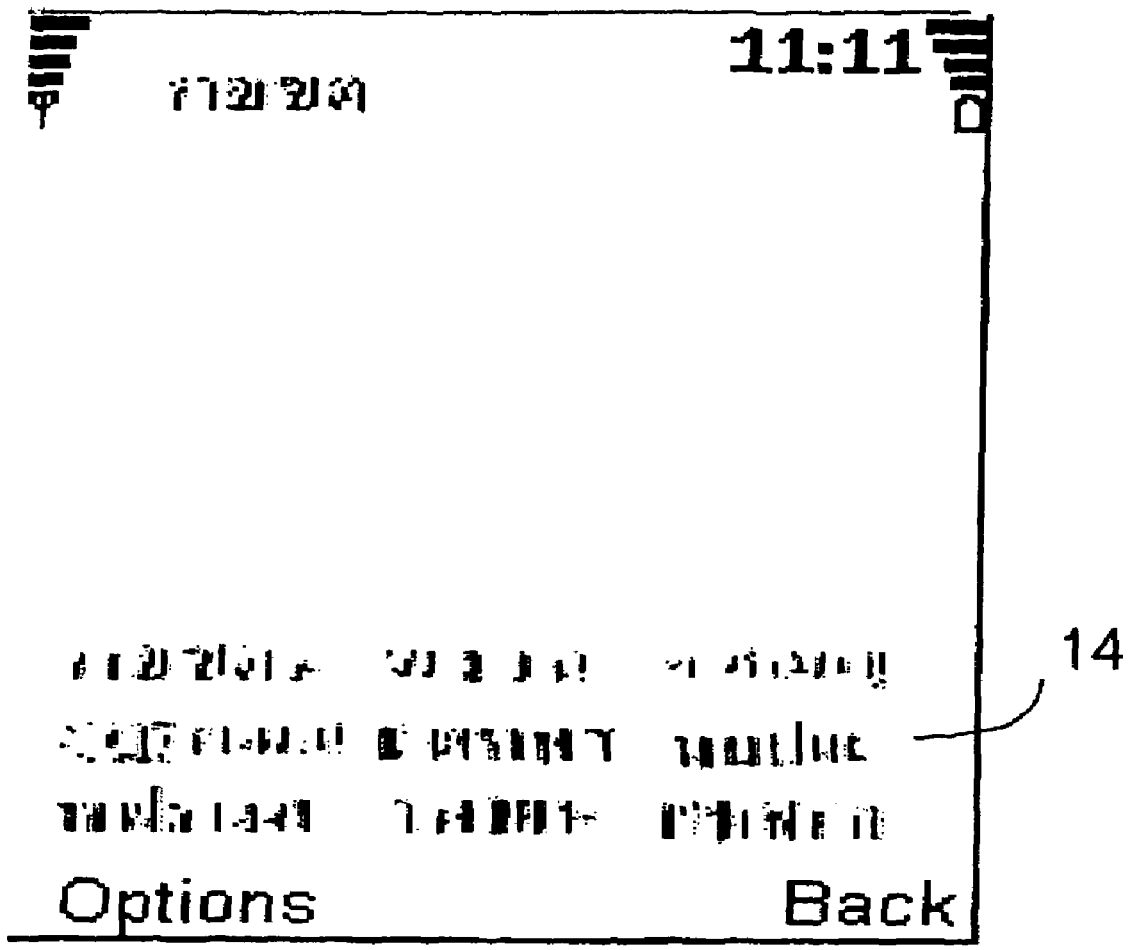
FIG. 8 is an illustration of a display in consonant mode of this invention.

In the text input state of mobile phone 1, a vertical key mapping sequence is shown, as a 3×3 grid 14 on the screen 5, as shown in FIG. 8. Each cell of the grid includes the letters that are mapped to each physical key, from key 1 to key 9. FIG. 8 shows the display on screen 5 in consonant mode. It shows ก ข ฃ ค ฅ are the letters mapped to key 1; ง จ ฉ ช are the letters mapped to key 2; and so on. From the key mapping display, the user can decide which physical key is right and how many times it should be pressed to enter the desired letter.

When the user presses one of the array of keys 11, there will be some visual indication in the corresponding cell. Pressing the key once highlights the first letter in the cell. Further pressing moves the highlight to the next letter. For example, when user presses the 9 key once, the first letter "ก" in the ninth cell is highlighted. Press again, the highlight moves to the second letter "ข". The process continues until user finds the desired letter.

FIG. 7 and FIG. 8 present the key mapping in consonant and non-consonant input mode respectively. The consonant input mode key mapping is the same as other multi-taping input method. The non-consonant input group is mapped according to the following rules:

a. Above vowel (5) and above diacritics (4) are mapped to the above set of keys, such as key nos. 1 to 3;

b. Leading vowels (5) and common following vowels (4) are mapped to the middle set of keys, for example key nos. 4-6;

c. Below vowels (2) and below diacritics (1) are mapped to one of the below keys, keys nos. 7-9, such as key no. 8;

d. Tone marks (4) are mapped to key no. 9, e. Others (3) are mapped to key no. 7.

The mapping of the non-consonant group is therefore accomplished according to three principles:

Position information compatibility. All above items (vowels and diacritics) are mapped to the keys in the top of numeric keypad (a). All lower items are mapped to the keys in the bottom of the numeric keypad (c). Leading vowels is placed in front of following vowels (b).

All items from same group are placed close to each other.

Each physical key is mapped with similar number of letters, key 1 to key 8 with three letters, key 9 with four letters.

In some applications it is advantageous to avoid the need for an on screen display to assist the multi-tap method. Accordingly, in an alternate embodiment, the invention may be implemented without visual indication. To accomplish this, the mapping of the consonant group 20 is printed on the assigned keys 11. Consonant key mapping are, therefore, printed on the face of keys 11, just as other phones using multi-tap with Thai characters. So in consonant mode, there is no need of visual indication at all. User can rely on physical key print to input. When user enters non-consonant mode, the vowel indication grid is shown on the display. User can use the indication to input the corresponding vowels.

In another alternate embodiment, both consonant and non-consonant key mapping are printed on the physical keys. In consonant input mode, the consonant key mapping is valid. In non-consonant mode, the non-consonant key mapping is used. So user can rely on the physical key print to input.

In another alternate embodiment dynamic keypad identification may be used. In this embodiment, the mapping indications on the keypad are controlled by software so that the keypad indications can be changed dynamically. When user changes the input mode from consonant to non-consonant mode, the keypad is also changed accordingly. In this case, visual indication is redundant.

It should be understood that the above description is only illustrative of the invention. Various alternatives and modifications can be devised by those skilled in the art with out departing from the invention. Accordingly, the present inven-

What is claimed is:

1. A method of entering text in a mobile communication device comprising the steps of:
   storing a list of the characters used in a language based on a Thai alphabet to be entered by use of a standard keypad of the mobile communications device;
   dividing the list of characters into at least first and second groups;
   adapting a standard keypad of the mobile communications device for operation in a first and second mode selectable by the user by the activation of a dedicated key of the keypad;
   mapping each of the characters of the first group to a key of the keypad for selection, when the keypad is operating in the first mode;
   mapping each of the characters of the second group to a key of the keypad for selection, when the keypad is operating in the second mode;
   selecting an alphabetic character for entry into the mobile communications device;
   determining which of the first and second groups contains the selected alphabetic character;
   selecting the mode of operation corresponding to the group containing the selected character;
   entering the selected character by multi-tapping the key to which the character is mapped; and
   wherein the first group is comprised only of consonant characters and the second group comprises only non-consonant characters.

2. The method according to claim 1 further comprising the step of displaying the characters mapped to each key of said keypad in a selected mode of operation.

3. The method according to claim 2 further comprising the step of highlighting the character selected by each tap of a key.

4. The method according to claim 1 further comprising the step of identifying the characters of the first group mapped to each key on the associated key and displaying the characters of the second group mapped to each key according to the selected mode of operation.

5. The method according to claim 1 further comprising the step of mapping the second group by position information compatibility.

6. The method according to claim 5 wherein the keypad has above and below keys and all above vowels and diacritics are mapped to the keys in the above keys of the keypad, all below vowels and diacritics are mapped to the below keys of the keypad, and leading vowels are placed in front of following vowels.

7. The method according to claim 5 wherein all similar characters are mapped to keys that are close to each other.

8. The method according to claim 5 wherein each key is mapped with a similar number of letters.

9. Apparatus for entering text in a mobile communications device comprising:
   a mobile communications keypad having a standard array of keys available for entering data;
   a memory for storing a list of the characters used in a language based on a Thai alphabet to be entered by using the standard array of keys of the mobile communications device, the memory storing said list divided into at least first and second groups;
   a microprocessor controller of the mobile communications device having computer executable code contained therein for mapping each of the alphabetic characters of the first group to the keys of the keypad and for mapping each of the alphabetic characters of the second group to the keys of the keypad;
   a dedicated key for selectably switching the keypad between at least a first and second mode of operation; and
   wherein the microprocessor controller is adapted to switch the characters mapped to said keys between the first group and second group according to the first or second modes of operation respectively in response to operation of the dedicated switch; and
   wherein the first group is comprised only of consonant characters and the second group comprises only non-consonant characters.

10. The apparatus according to claim 9 wherein the computer executable code allows characters to be selected for entry into the mobile communications device by multi-tapping the key to which the character is mapped.

11. The apparatus according to claim 9 further comprising a display screen for displaying the characters mapped to each key of said keypad according to the mode of operation.

12. The apparatus according to claim 11 wherein the character selected by each tap of a key is highlighted in the display.

13. The apparatus according to claim 9 further comprising a display screen and wherein the characters of the first group are identified on the key to which said characters are mapped and the characters of the second group are displayed as mapped to each key.

14. The apparatus according to claim 9 wherein the second group is mapped to the keys by position and information compatibility.

15. The apparatus according to claim 14 wherein the keypad has above and below keys and all above vowels and diacritics are mapped to the keys in the above keys of the keypad, all below vowels and diacritics are mapped to the below keys of the keypad, and leading vowels are placed in front of following vowels.

16. The apparatus according to claim 14 wherein all similar characters are mapped to keys that are close to each other.

17. The apparatus according to claim 14 wherein each key is mapped with a similar number of letters.

18. A computer processor useable storage medium having processor readable code means embodied therein for causing a processor or cooperating processors to enter text in a mobile communication device, the processor readable code means in the computer program product comprising:
   processor readable program code means for causing a processor to store a list of the characters used in a language based on a Thai of a non-latin, extended alphabet to be entered by use of a standard keypad of the mobile communications device;
   processor readable program code means for causing a processor to divide the list of characters into at least first and second groups;
   processor readable program code means for causing a processor to adapt a standard keypad of the mobile communications device for operation in a first and second mode selectable by the user by the activation of a dedicated key of the keypad;
   processor readable program code means for causing a processor to map each of the characters of the first group to a key of the keypad for selection, when the keypad is operating in the first mode;
   processor readable program code means for causing a processor to map each of the characters of the second group to a key of the keypad for selection, when the keypad is operating in the second mode;

processor readable program code means for causing a processor to select an alphabetic character for entry into the mobile communications device;

processor readable program code means for causing a processor to determine which of the first and second groups contains the selected alphabetic character;

processor readable program code means for causing a processor to select the mode of operation corresponding to the group containing the selected character; and processor readable program code means for causing a processor to enter the selected character by multi-tapping the key to which the character is mapped; and wherein the first group is comprised only of consonant characters and the second group comprises only non-consonant characters.

19. A mobile communications device comprising:

a mobile communications keypad having a standard array of keys available for entering data;

a memory for storing a list of the characters alphabet to be entered by using the standard array of keys of the mobile communications device, the memory storing said list divided into at least first and second groups;

a microprocessor controller of the mobile communications device having computer executable code contained therein for mapping each of the alphabetic characters of the first group to the keys of the keypad and for mapping each of the alphabetic characters of the second group to the keys of the keypad;

a dedicated key for selectably switching the keypad between at least a first and second mode of operation; and wherein the microprocessor controller is adapted to switch the characters mapped to said keys between the first group and second group according to the first or second modes of operation respectively in response to operation of the dedicated switch; and wherein the first group is comprised only of consonant characters and the second group comprises only non-consonant characters.

* * * * *